(12) United States Patent
Carlson

(10) Patent No.: US 10,850,593 B2
(45) Date of Patent: Dec. 1, 2020

(54) FLAP-RETAINING CLIP FOR A PRESSURE RELIEF ASSEMBLY

(71) Applicant: Illinois Tool Works Inc., Glenview, IL (US)

(72) Inventor: Daniel David Carlson, Fenton, MI (US)

(73) Assignee: Illinois Tool Works Inc., Glenview, IL (US)

( * ) Notice: Subject to any disclaimer, the term of this patent is extended or adjusted under 35 U.S.C. 154(b) by 353 days.

(21) Appl. No.: 15/747,836

(22) PCT Filed: Nov. 1, 2016

(86) PCT No.: PCT/US2016/059866
§ 371 (c)(1),
(2) Date: Jan. 26, 2018

(87) PCT Pub. No.: WO2017/079133
PCT Pub. Date: May 11, 2017

(65) Prior Publication Data
US 2018/0215236 A1 Aug. 2, 2018

Related U.S. Application Data

(60) Provisional application No. 62/251,804, filed on Nov. 6, 2015.

(51) Int. Cl.
*B60H 1/24* (2006.01)
*F16K 15/14* (2006.01)
(Continued)

(52) U.S. Cl.
CPC ............ *B60H 1/249* (2013.01); *F16K 15/035* (2013.01); *F16K 15/144* (2013.01); *F24F 11/745* (2018.01); *F24F 2013/1493* (2013.01)

(58) Field of Classification Search
CPC .......... B60H 1/249; B60H 1/24; B60H 1/248; F16K 15/031; F16K 15/035; F16K 15/16;
(Continued)

(56) References Cited

U.S. PATENT DOCUMENTS

| 5,601,117 A | 2/1997 | Lewis |
| 5,904,618 A | 5/1999 | Lewis |

(Continued)

FOREIGN PATENT DOCUMENTS

EP 1491373 12/2004

OTHER PUBLICATIONS

International Search Report and Written Opinion for PCT/US2016/059866.

*Primary Examiner* — Vivek K Shirsat
*Assistant Examiner* — Ko-Wei Lin
(74) *Attorney, Agent, or Firm* — Quarles & Brady LLP

(57) ABSTRACT

A pressure relief assembly includes a housing defining an air passage chamber having at least one opening, and a membrane flap secured within the air passage chamber. The membrane flap is configured to move into an open position to expose the opening(s) to relieve air pressure. A plurality of flap-retaining clips securely couple the membrane flap to the housing. Each of the plurality of the flap-retaining clips includes a main body. A housing-connecting tab extends from a first end of the main body. The housing-connecting tab is retained within a retaining channel formed in the housing. Opposed flap-retention wings laterally extend from opposite sides of the main body. A portion of the membrane flap is trapped between the opposed flap-retention wings and the housing to securely couple the membrane flap to the housing.

19 Claims, 7 Drawing Sheets

(51) Int. Cl.
*F24F 11/74* (2018.01)
*F16K 15/03* (2006.01)
*F24F 13/14* (2006.01)

(58) Field of Classification Search
CPC ................. F16K 15/144; F16K 15/10; A61M
2039/244; A61M 2039/2433; F04B
53/1037; F04B 39/1086; F04B 39/1073
USPC .................. 137/855, 512.15; 454/162, 70
See application file for complete search history.

(56) References Cited

U.S. PATENT DOCUMENTS

| | | | |
|---|---|---|---|
| 6,026,852 A | 2/2000 | Barton | |
| 6,210,266 B1 | 4/2001 | Barton | |
| 8,360,104 B2 | 1/2013 | Shereyk | |
| 2004/0261867 A1* | 12/2004 | Carlson | B60H 1/249 |
| | | | 137/852 |
| 2005/0189024 A1* | 9/2005 | Dippel | B60H 1/249 |
| | | | 137/855 |
| 2007/0175523 A1 | 8/2007 | Levey | |
| 2015/0165873 A1 | 6/2015 | Schwarzkopf | |

* cited by examiner

FLAP-RETAINING CLIP FOR A PRESSURE RELIEF ASSEMBLY

RELATED APPLICATIONS

This application is a National Phase of International Application No. PCT/US2016/059866, filed Nov. 1, 2016, which relates to and claims priority benefits from U.S. Provisional Patent Application No. 62/251,804 entitled "Flap-Retaining Clip For A Pressure Relief Assembly," filed Nov. 6, 2015, both of which are hereby incorporated by reference in their entireties.

FIELD OF EMBODIMENTS OF THE DISCLOSURE

Embodiments of the present disclosure generally relate to a venting or pressure relief device configured for use in an enclosed area, such as an automobile, and more particularly to a flap-retaining clip that is used to secure a membrane flap to a housing of a pressure relief device.

BACKGROUND

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications.

A conventional pressure relief device includes a plastic housing having a plurality of air passages. A light membrane is positioned over the air passages, and is configured to allow air to pass in one direction. In order to allow air to pass, the light membrane opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, a user presses on the four corners of the pressure relief device in order to secure it within a reciprocal hole in a structure, such as a frame or sheet within a vehicle.

U.S. Pat. No. 5,601,117, entitled "Flap-Type Pressure Relief Valve" discloses a flap-type pressure relief valve that includes a frame defining a flow passage and a flap valve element positioned to overlie the flow passage. Retainer pins extend from the frame through openings in a peripheral edge of the flap valve element. A separate and distinct retainer bar is pivotally joined with the frame and cooperates with the retaining pins to overlie a peripheral edge of the flap valve element and retain the flap valve element on the retainer pins.

U.S. Pat. No. 5,904,618, entitled "Pressure Relief Valve," discloses a flap valve element that is received on outwardly extending molded pins and retained thereon by a pivotally mounted web member that can be moved downwardly over the pins and retained thereon.

U.S. Patent Application Publication No. 2015/0165873, entitled "Return Air Blocking Device for Ventilation of the Interior of a Motor Vehicle," discloses an assembly having at least one flexible flap secured to a housing. U.S. Patent Application Publication No. 2007/0175523, entitled "Pressure Relief Assembly," discloses a pressure relief device that protects against debris and moisture infiltration. U.S. Pat. No. 6,210,266, entitled "Pressure Relief Valve and Method of Manufacturing the Same," discloses a valve flap assembly for use with a pressure relief valve that is produced by a co-molding operation.

Certain known retainer pins include notches between an edge and a stepped shoulder in order to secure the retainer bar thereto. However, it has been found that debris may accumulate within the notches and/or on the shoulder. Further, such connections may provide leak paths. As such, fluid (whether air or liquid) may infiltrate through the pressure relief device.

SUMMARY OF EMBODIMENTS OF THE DISCLOSURE

A need exists for a pressure relief assembly that is less susceptible to debris accumulation. A need exists for a pressure relief assembly that includes membrane flaps secured to a housing without leak paths.

With those needs in mind, certain embodiments of the present disclosure provide a flap-retaining clip that is configured to securely couple a membrane flap to a housing of a pressure relief assembly. The flap-retaining clip includes a main body. A housing-connecting tab extends from a first end of the main body. The housing-connecting tab is configured to be inserted into and retained within a retaining channel formed in the housing. Opposed flap-retention wings laterally extend from opposite sides of the main body. A portion of the membrane flap is configured to be trapped between the opposed flap-retention wings and the housing to securely couple the membrane flap to the housing. The flap-retaining clip may be devoid of a stepped shoulder connected to the housing-connecting tab.

Each of the opposed lap-retention wings may include an angled lead-in edge that downwardly and outwardly angles from a top end of the main body towards a bottom end. In at least one embodiment, the angled lead-in edge is arcuate.

The flap-retaining may also include a rounded tip upwardly extending from a top end of the main body. The rounded tip is configured to guide the membrane flap onto the flap-retaining clip. In at least one embodiment, an angled ramp extends between the arcuate tip and the main body.

In at least one embodiment, bottom edges of the opposed flap-retention wings are configured to be separated from a front surface of a portion of the housing. A portion of the membrane flap is configured to be trapped between the front surface and the bottom edges of the opposed flap-retention wings.

A securing member may extend between the main body and the housing-connecting tab. The securing member is configured to secure the flap-retaining clip within a channel of the housing.

The flap-retaining clip may be integrally formed and molded as a single piece. In at least one embodiment, the flap-retaining clip is molded within a cavity of a forming chamber of a forming assembly. The forming assembly separates in a vertical direction such that the flap-retaining clip remains connected to a core of a top portion of the forming assembly. A retainer is moved away from the flap-retaining clip to allow the flap-retaining clip to be removed from the forming assembly.

Certain embodiments of the present disclosure provide a pressure relief assembly that includes a housing defining an air passage chamber having at least one opening, and a membrane flap secured within the air passage chamber. The membrane flap is configured to move into an open position to expose opening(s) to relieve air pressure. A plurality of flap-retaining clips securely couple the membrane flap to the housing.

Figure 1:
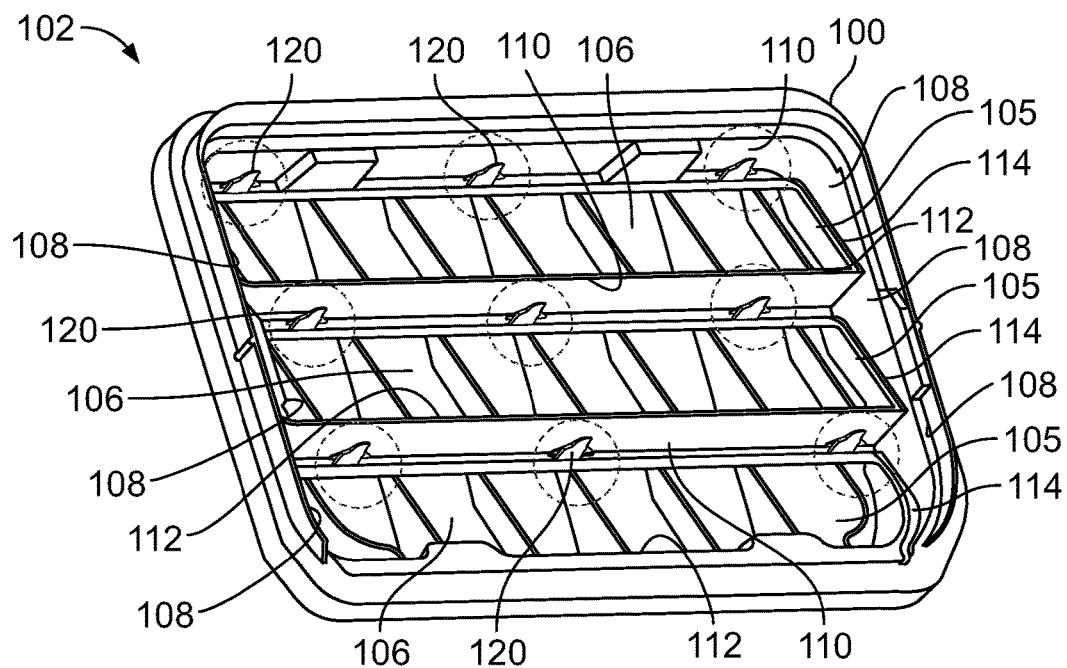
FIG. 1 illustrates a front perspective view of a housing of a pressure relief assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a flap-retaining clip that is used to secure a membrane flap to a housing of a pressure relief assembly. The flap-retaining clip may be efficiently manufactured, such as through a two-stage knockout process. The flap-retaining clip is used to secure the membrane flap to the housing without the use of a separate and distinct retainer bar. Additionally, the flap-retaining clip may be devoid of a stepped shoulder or stop, which may otherwise be susceptible to attracting and/or retaining debris, and/or provide a leak path.

Examples of pressure relief assemblies are shown and described in U.S. Pat. No. 8,360,104, entitled "Pressure Relief Assembly," which is hereby incorporated by reference in its entirety.

FIG. 1 illustrates a front perspective view of a frame or housing 100 of a pressure relief assembly 102, according to an embodiment of the present disclosure. Membrane flaps of the pressure relief assembly 102 are not shown in FIG. 1. The pressure relief assembly 102 is configured to be secured to a panel, such as one formed of sheet metal and found on a vehicle, for example. The pressure relief assembly 102 secures into an opening formed through the panel. For example, the housing 100 of the pressure relief assembly 102 snapably secures into the opening formed through the panel.

The housing 100 includes a plurality of air passage chambers 105 defining one or more openings 106. In a closed, at-rest position, the membrane flaps (not shown in FIG. 1) are positioned over the openings 106. The pressure relief assembly 102 may include more or less air passage chambers 105 and openings 106 than shown. Each air passage chamber 105 includes lateral walls 108 integrally connected to top and bottom walls 110 and 112, respectively. An air passage wall 114 extends between the lateral, top and bottom walls 108, 110, and 112, respectively. The air passage wall 114 defines the openings 106 that are configured to allow air to pass therethrough. For example, the air passage wall 114 may include multiple vertical fins that define the openings 106 therebetween. The air passage wall 114 angles upwardly from the top wall 110 to the bottom wall 112. The angle of the air passage wall 114 may vary based on a desired amount of flap resistive force.

The housing 100 may be formed of a plastic, such as acrylic. In at least one embodiment, the housing 100 may be formed of polypropylene. The housing 100 may be formed through a thermoforming process, which is generally an efficient and economical way of making various plastic devices. During the manufacturing process, a roll of plastic may be fed into a cavity, and then the plastic is formed using heat and pressure. In at least one embodiment, the housing 100 may be formed through an injection-molding process.

Instead of a plurality of air passage chambers 105, the housing 100 may include a single air passage chamber 105. Also, optionally, the air passage wall 114 may be coplanar with a flat underside of the housing 100, instead of being angled.

Each membrane flap is anchored to the housing 100 proximate to the top wall 110 through one or more flap-retaining clips 120. For example, each flap-retaining clip 120 mounts to the housing 100 proximate to or at a junction of a top wall 110 and an air passage wall 114. The flap-retaining clip 120 secures an at-rest membrane flap to the housing 100 over the air passage wall 114. The membrane flaps may be formed of a flexible thermoplastic elastomer, such as polypropylene, Hytrel, Lexan, Tyvac or Mylar, for example, a rubber (such as EPDM rubber), and/or the like.

In at-rest positions, the membranes flaps cover the openings 106 formed through the air passage walls 114. As air pressure builds and is exerted into an underside of the membranes flaps, the membranes flaps upwardly deflect into an open position about the flap-retaining clips 120 so that the openings 106 are exposed, thereby allowing air to vent through the pressure relief assembly 102.

Figure 2:
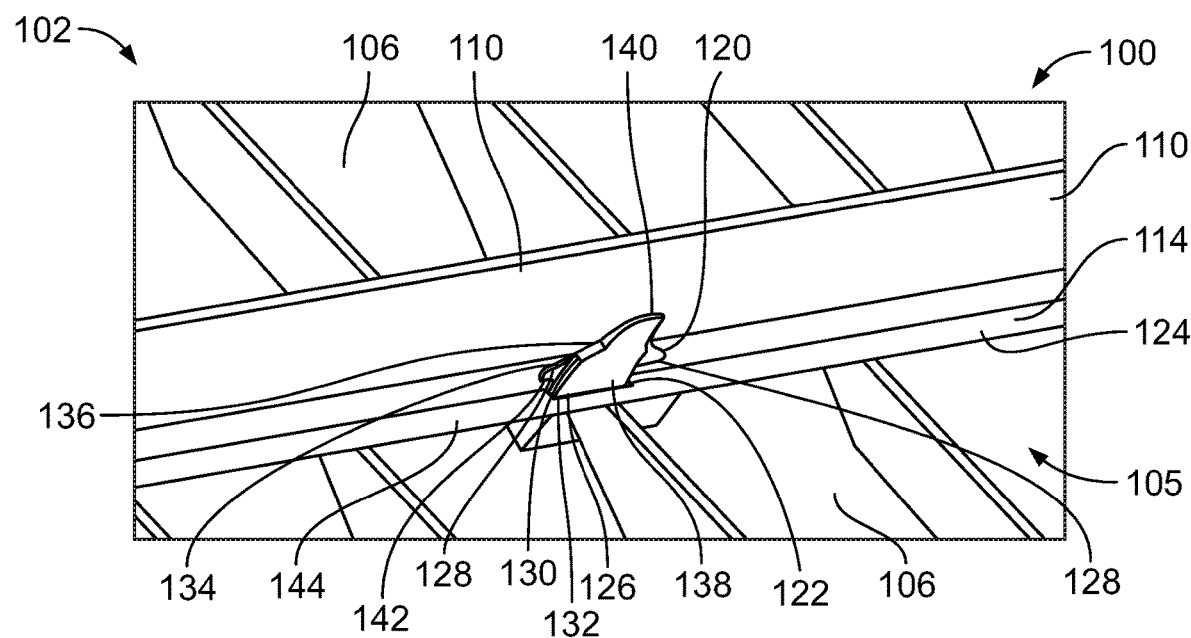
FIG. 2 illustrates a front perspective view of a flap-retaining clip secured to a housing of a pressure relief assembly, according to an embodiment of the present disclosure.

FIG. 2 illustrates a front perspective view of a flap-retaining clip 120 secured to the housing 100 of the pressure relief assembly 102, according to an embodiment of the present disclosure. As shown, the flap-retaining clip 120 may be securely mounted proximate to a junction between the top wall 110 and the air passage wall 114. For example, the flap-retaining clip 120 may securely mount to a retaining channel 122 formed in a bracket 124 of the top wall 110 and/or the air passage wall 114. In at least one embodiment, the bracket 124 may be formed between the top wall 110 and the air passage wall 114. In at least one embodiment, the bracket 124 and the clips 120 are integrally formed and molded as part of a housing 100.

The flap-retaining clip 120 may be integrally molded and formed as a single piece. In at least one embodiment, the flap-retaining clip 120 is formed of the same material as the housing 100. In at least one other embodiment, the flap-retaining clip 120 is formed of a different material than the housing 100. For example, the flap-retaining clip 120 may be formed of metal.

The flap-retaining clip 120 includes a housing-connecting tab (hidden from view) that extends from a bottom end of a main body 126. The housing-connecting tab is inserted into and retained within the retaining channel 122 formed in the bracket 124. Opposed flap-retention wings 128 laterally extend from opposite sides of the main body 126. As shown, the flap retention wings 128 may laterally extend from a rear surface 130 of the main body 126, and may be offset from a front surface 132 of the main body 126. The flap-retention wings 128 are mirror image structures of one another.

Each wing 128 includes an angled lead-in edge 134, such as a chamfered or other such beveled edge that downwardly and outwardly angles from a top end 136 of the main body 126 towards a bottom end 138. A rounded tip 140 upwardly extends from the top end 136 of main body 126, and provides a flap alignment tip. As shown, the flap-retaining clip 120 is devoid of a stepped shoulder connected to the housing-connecting tab opposite from the main body 126.

In the installed position, as shown in FIG. 2, bottom edges 142 of the wings 128 are separated from a front surface 144 of the bracket 124. As explained below, a portion of a membrane flap is configured to be trapped between the bracket 124 and the bottom edges 142 of the wings 128. As such, the membrane flap is securely retained within the housing 100 by the flap-retaining clip 120.

Figure 3:
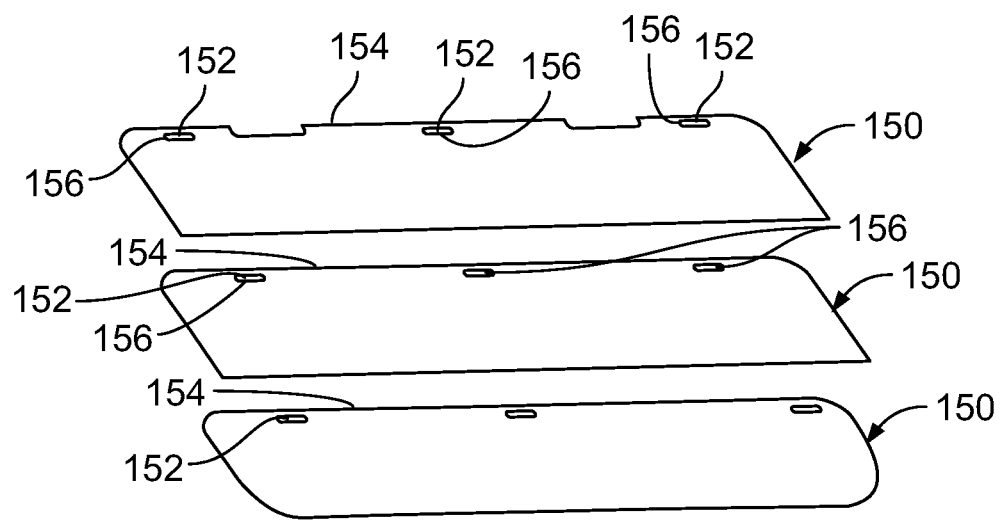
FIG. 3 illustrates a front perspective view of membrane flaps, according to an embodiment of the present disclosure.

FIG. 3 illustrates a front perspective view of membrane flaps 150, according to an embodiment of the present disclosure. The membrane flaps 150 include slots 152 proximate to top edges 154. The number of slots 152 coincides with the number of flap-retaining clips 120 (shown in FIGS. 1 and 2) within each air passage chamber 105 (shown in FIGS. 1 and 2.). Each slot 152 has a length that is less than a distance between terminal edges of the wings 128 of the flap-retaining clip 120 (shown in FIGS. 1 and 2.).

Referring to FIGS. 1-3, in order to secure the membrane flaps 150 to the housing 100, the slots 152 are aligned with the flap-retaining clips 120 and urged onto the flap-retaining clips 120. The rounded tips 140 automatically guide the membrane flaps 150 into a centered positioned with respect to the flap-retaining clips 120. That is, the rounded, arcuate edges of the tips 140 abut into internal edges 156 that define the slots 152, and cause the slots 152 to align with the flap-retaining clips 120 as the membrane flaps 150 are urged toward the bracket 124.

With continued urging towards the bracket 124, the edges 156 of membrane flaps 150 that define the slots 152 slide over the flap-retention wings 128, which cause the slots 152 to expand, due to the increasing angle of the lead-in edges 134 between the opposed flap-retention wings 128 towards the bracket 124. As the membrane flaps 150 encounter the blunt bottom ends 136 of the wings 128, the edges 156 flex back to at-rest positions, and hook underneath the bottom ends 136. As such, the edges 156 that define the slots 152 are trapped between the bottom ends 136 of the wings 128 and the front surface 144 of the bracket 124, thereby securing the membrane flaps 150 to the housing 100.

Figure 4:
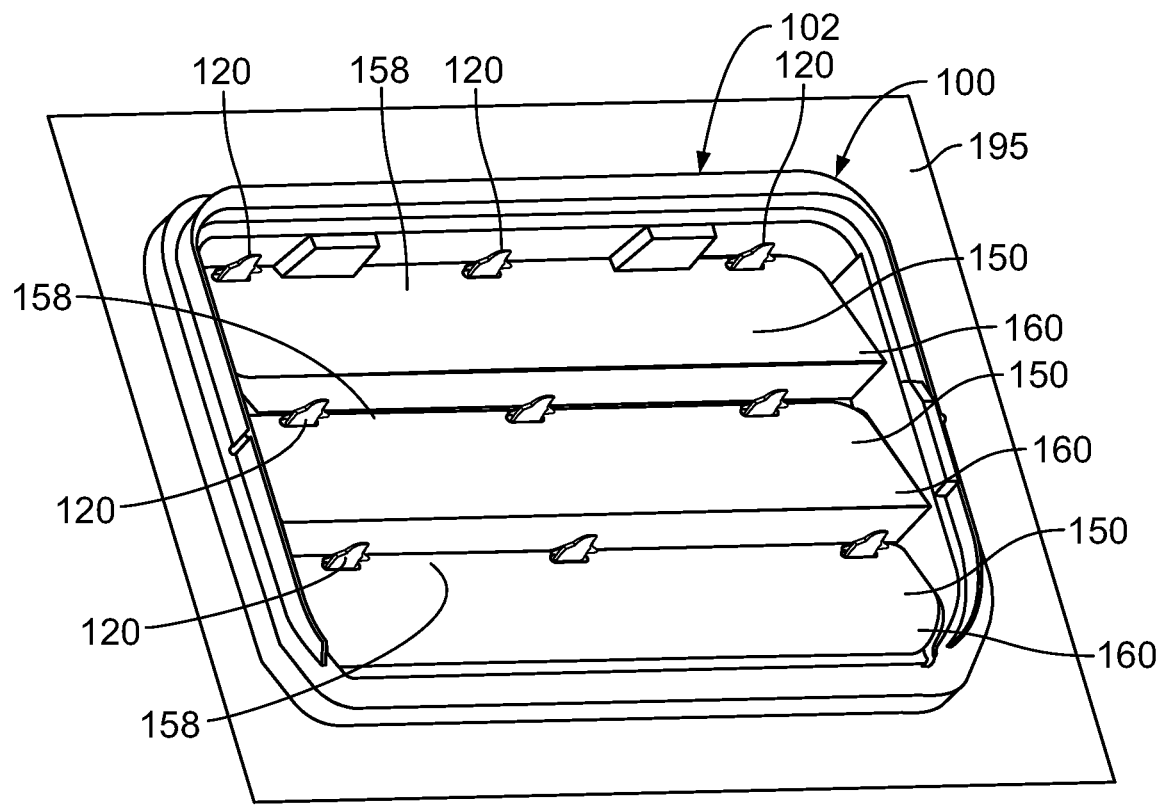
FIG. 4 illustrates a front perspective view of a pressure relief assembly secured to a component, according to an embodiment of the present disclosure.

FIG. 4 illustrates a front perspective view of the pressure relief assembly 102 secured to a component 195 (such as panel of sheet metal of a vehicle), according to an embodiment of the present disclosure. The membrane flaps 150 are secured to the housing 100 proximate to upper ends 158 by the flap-retaining dips 120, as described above. Bottom ends 160 of the membrane flaps 150 overlay the air passage walls 114 (shown in FIGS. 1 and 2), but are not fixed thereto. As such, with increased air pressure, the membrane flaps 150 upwardly deflect and expose the openings 106 (shown in FIGS. 1 and 2).

Figure 5:
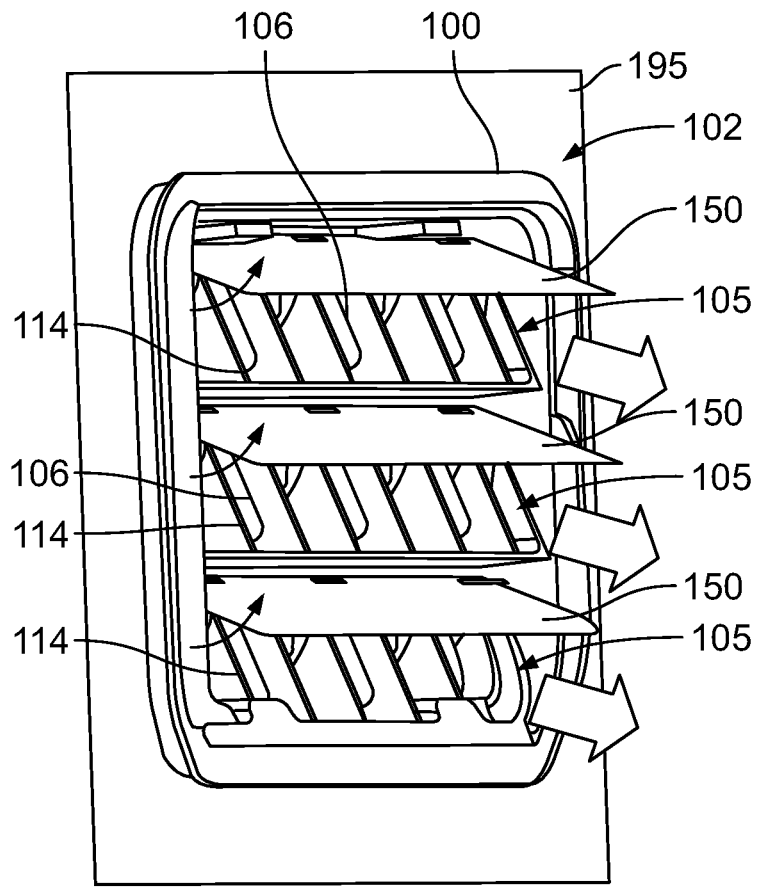
FIG. 5 illustrates a front perspective view of a pressure relief assembly having opened membrane flaps, according to an embodiment of the present disclosure.

FIG. 5 illustrates a front perspective view of the pressure relief assembly 102 having opened membrane flaps 150, according to an embodiment of the present disclosure. Air pressure of a predetermined magnitude that is exerted into the undersides of the membrane flaps 150 forces the membranes flaps 150 to upwardly deflect open about the brackets 124 (shown in FIG. 2), thereby exposing the openings 106 formed through the air passage walls 114. The exposed openings 106 allow air to escape through the pressure relief assembly 102, thereby relieving air pressure from within a vehicle.

Figure 6:
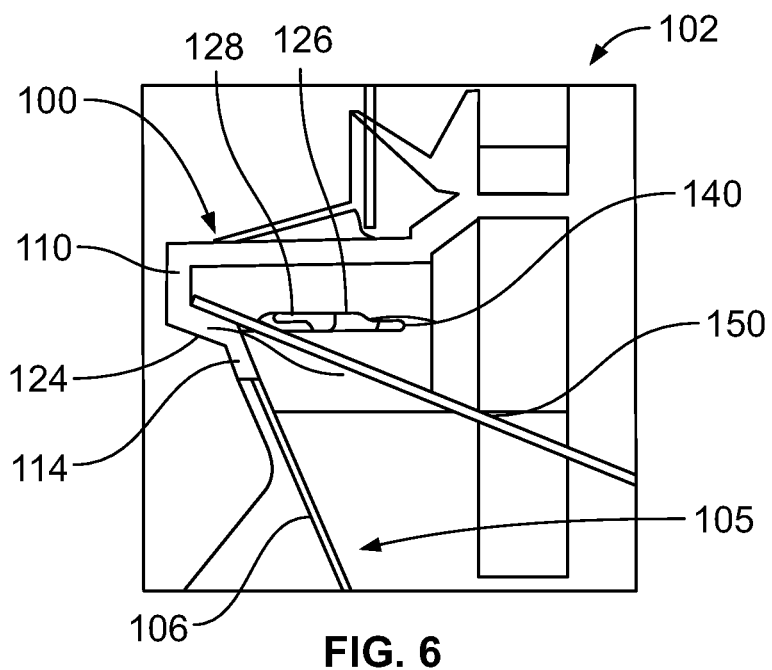
FIG. 6 illustrates a lateral view of a flap-retaining clip securing a membrane flap to a housing of a pressure relief assembly, according to an embodiment of the present disclosure.

FIG. 6 illustrates a lateral view of the flap-retaining clip 120 securing a membrane flap 150 to the housing 100 of the pressure relief assembly 102, according to an embodiment of the present disclosure. The membrane flap 150 is shown in an open position, such that openings 106 are exposed. The flap-retaining clip 120 also provides a barrier past which the membrane flap 150 is prevented from moving.

Figure 7:
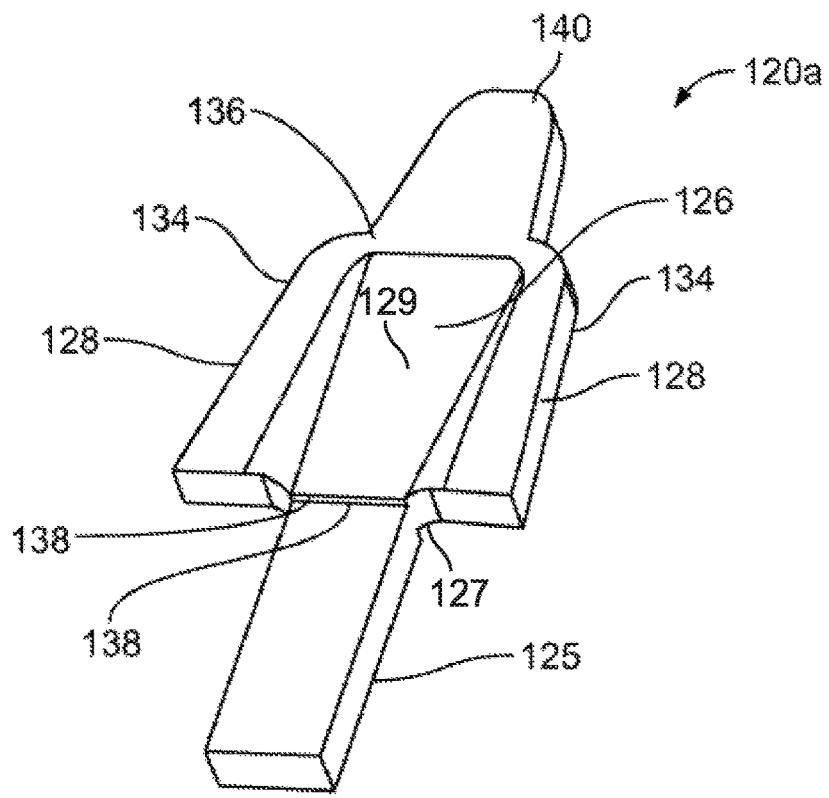
FIG. 7 illustrates a rear perspective view of a flap-retaining clip, according to an embodiment of the present disclosure.

FIG. 7 illustrates a rear perspective view of the flap-retaining clip 120, according to an embodiment of the present disclosure. As described above, the flap-retaining clip 120 includes the housing-connecting tab 125, which downwardly extends from the main body 126. Each flap-retention wing 128 includes an angled lead-in edge 134, such as a chamfered edge or other beveled edge that downwardly and outwardly angles form a top end 136 of the main body 126 towards the bottom end 138. The rounded tip 140 upwardly extends from the top end 136 of the main body 126, and provides a flap alignment tip. The flap-retaining clip 120 includes a first face 127 and a second face 129 opposite the first face 127. The flap-retaining clip 120 is devoid of a stepped shoulder connected to the housing-connecting tab opposite from the main body.

As shown, the bottom ends 138 of the wings 128 provide retaining edges. Portions of the membrane flaps 150 surrounding the slots 152 (shown in FIG. 3) are trapped between the bottom ends 138 and the upper surface 144 of the bracket 124 (shown in FIG. 2). The opposed bottom ends 138 may linearly connect to one another through an aligned bottom end 138 of the main body 126. That is, a straight, contiguous, linear edge may extend between the bottom ends 138 of the flap-retention wings 128.

Figure 8:
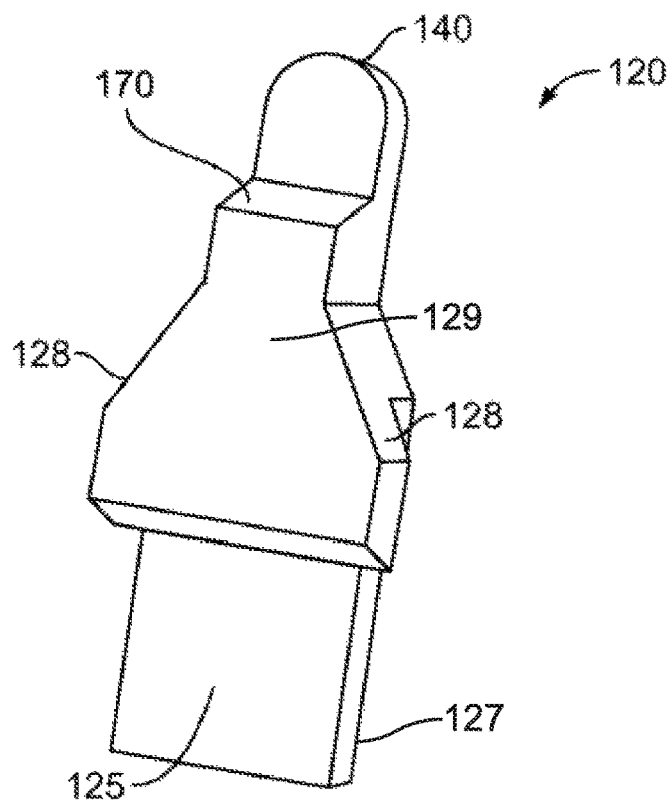
FIG. 8 illustrates a rear perspective view of a flap-retaining clip, according to an embodiment of the present disclosure.

FIG. 8 illustrates a rear perspective view of a flap-retaining clip 120a, according to an embodiment of the present disclosure. The flap-retaining clip 120a is similar to that shown in FIG. 7, except that the flap-retaining clip 120a may include an upwardly angled expansion ramp 170 between the tip 140 and the main body 126. The ramp 170 provides a smoother transition for the slot 152 of a membrane 150 (shown in FIG. 3) to slide over without the internal edges 156 snagging on sharp edges of the wings 128, for example. Further, the opposed flap-retention wings 128 may connect together through a solid and contiguous intermediate transition (as opposed to a channel therebetween, as shown in FIG. 7).

Figure 9:
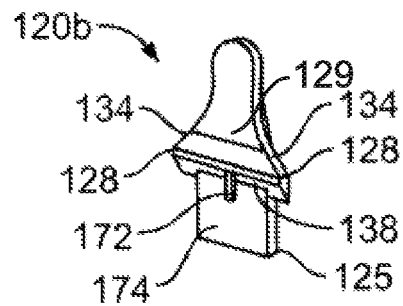
FIG. 9 illustrates a rear perspective view of a flap-retaining clip, according to an embodiment of the present disclosure.
Figure 10:
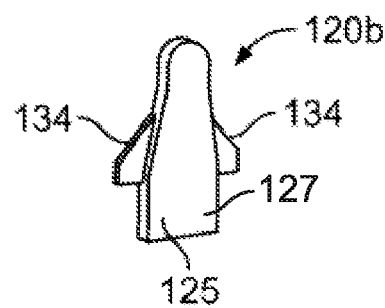
FIG. 10 illustrates a front perspective view of a flap-retaining clip, according to an embodiment of the present disclosure.

FIG. 9 illustrates a rear perspective view of a flap-retaining clip 120b, according to an embodiment of the present disclosure. FIG. 10 illustrates a front perspective view of the flap-retaining clip 120b. The flap-retaining clip 120b includes lead-in edges 134 that may be arcuate, instead of linear, which may reduce a possibility of membrane material being torn as the membrane flap is urged onto the flap-retaining clip 120b. Additionally, a securing member, such as securing rib 172, ramp, clasp, barb, hook, and/or the like, may extend between the bottom end 138 and a rear surface 174 of the housing-connecting tab 125. The securing rib 172 may cooperate with a reciprocal structure formed in the bracket 124 (shown in FIG. 2, for example) to secure the flap-retaining clip within the channel 122 (shown in FIG. 2) of the bracket 124.

Figure 11:
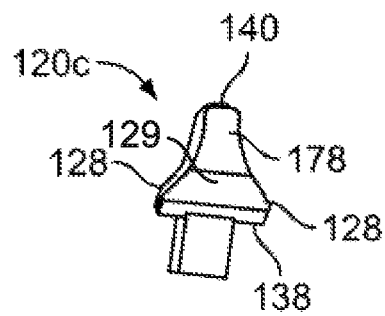
FIG. 11 illustrates a rear perspective view of a flap-retaining clip, according to an embodiment of the present disclosure.
Figure 12:
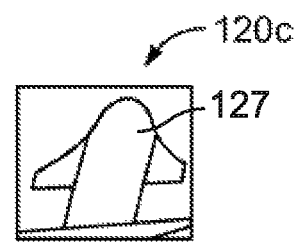
FIG. 12 illustrates a front perspective view of a flap-retaining clip, according to an embodiment of the present disclosure.

FIG. 11 illustrates a rear perspective view of a flap-retaining clip 120c, according to an embodiment of the present disclosure. FIG. 12 illustrates a front perspective view of the flap-retaining clip 120c. As shown, the wings 128 may inwardly (or, optionally, outwardly) extend with respect to a plane of a rear surface 178 of the arcuate tip 140, in order to secure to a housing of a particular size and shape. The housing-connecting tab 125 may be aligned with respect to the same plane as the rear surface 178 of the arcuate tip 140.

Figure 13:
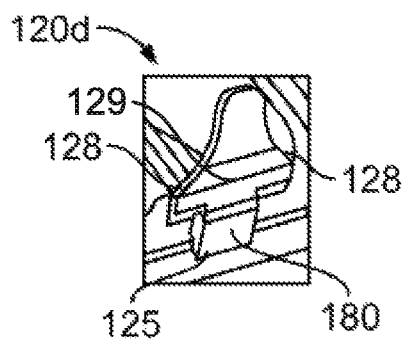
FIG. 13 illustrates a rear perspective view of a flap-retaining clip, according to an embodiment of the present disclosure.
Figure 14:
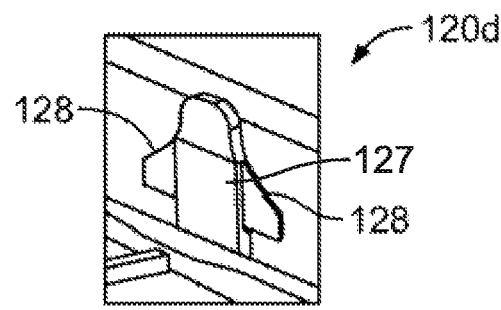
FIG. 14 illustrates a front perspective view of a flap-retaining clip, according to an embodiment of the present disclosure.

FIG. 13 illustrates a rear perspective view of a flap-retaining clip 120d, according to an embodiment of the present disclosure. FIG. 14 illustrates a front perspective view of the flap-retaining clip 120d. The wings 128 may outwardly (or, optionally, inwardly) extend with respect to a plane of a rear surface 180 of the housing-connecting tab 125, in order to secure to a housing of a particular size and shape.

Figure 15:
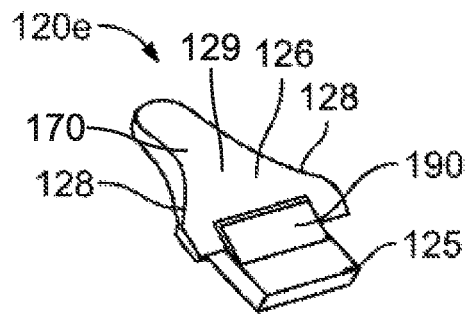
FIG. 15 illustrates a rear perspective view of a flap-retaining clip, according to an embodiment of the present disclosure.
Figure 16:
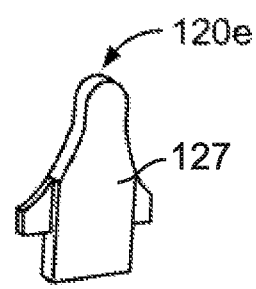
FIG. 16 illustrates a front perspective view of a flap-retaining clip, according to an embodiment of the present disclosure.

FIG. 15 illustrates a rear perspective view of a flap-retaining clip 120e, according to an embodiment of the present disclosure. FIG. 16 illustrates a front perspective view of the flap-retaining clip 120e. In this embodiment, a transition ramp 190 extends from the main body 126 and/or the wings 128 onto the housing-connecting tab 125. In at least one embodiment, the transition ramp 190 provides a securing member that is configured to secure the flap-retaining clip 120e into a reciprocal structure of a bracket 124.

Figure 17:
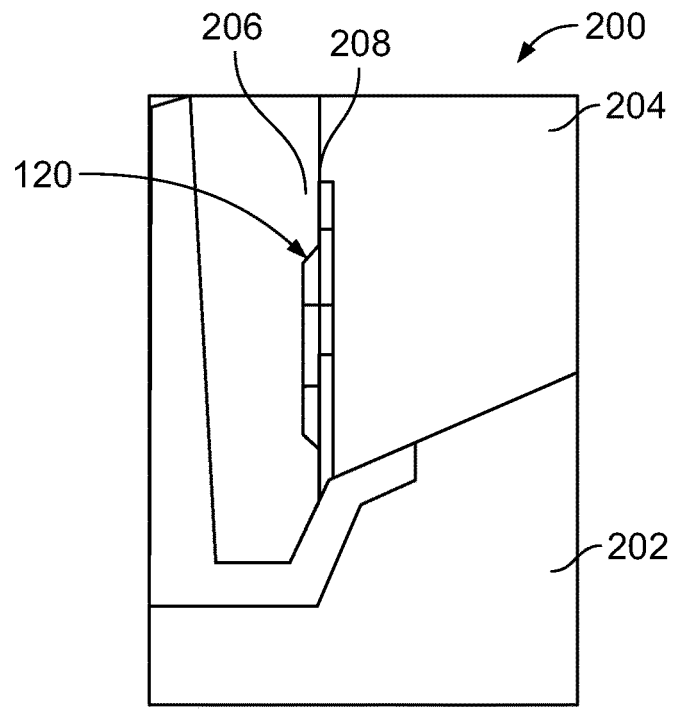
FIG. 17 illustrates a lateral internal view of a flap-retaining clip within a forming assembly during an initial molding stage, according to an embodiment of the present disclosure.

FIG. 17 illustrates a lateral internal view of the flap-retaining clip 120 within a forming assembly 200 during an initial molding stage, according to an embodiment of the present disclosure. The firming assembly 200 includes a bottom portion 202 (such as a bottom die or other such tool component) moveably coupled to a top portion 204 (such as an upper die or other such tool component). A forming chamber 206 is defined within the top portion 204. The flap-retaining clip 120 is molded within a cavity 208 of the forming chamber 206.

Figure 18:
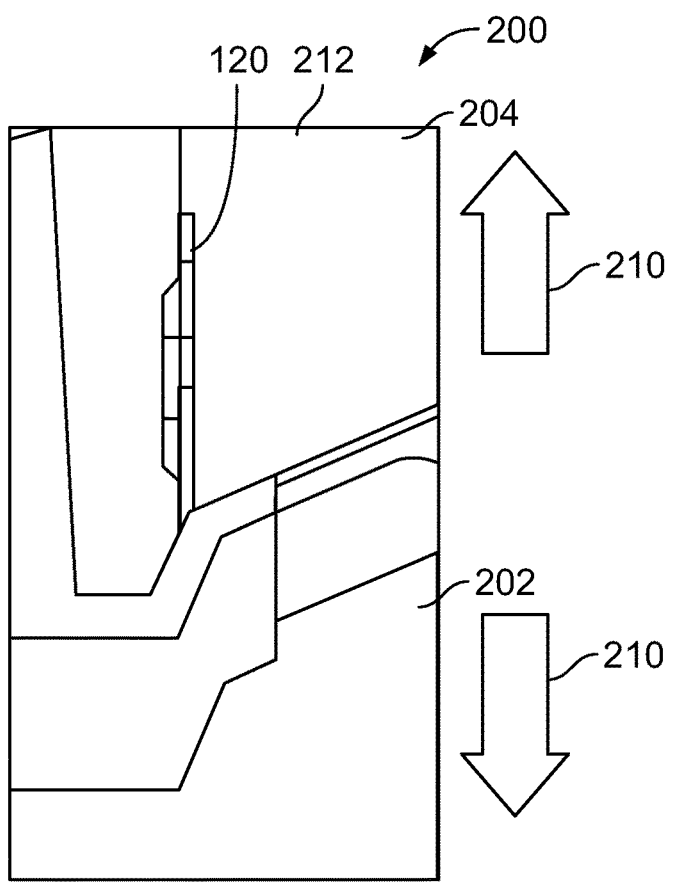
FIG. 18 illustrates a lateral internal view of a flap-retaining clip within a forming assembly during a separation stage, according to an embodiment of the present disclosure.

FIG. 18 illustrates a lateral internal view of the flap-retaining clip 120 within the forming assembly 200 during a separation stage, according to an embodiment of the present disclosure. As shown, the forming assembly 200 separates in a vertical direction of arrows 210, with the flap-retaining clip 120 remaining connected to a core 212 of the top portion 204. As shown, the bottom and top portions 202 and 204 separate relative to one another in a vertical direction denoted by arrows 210.

Figure 19:
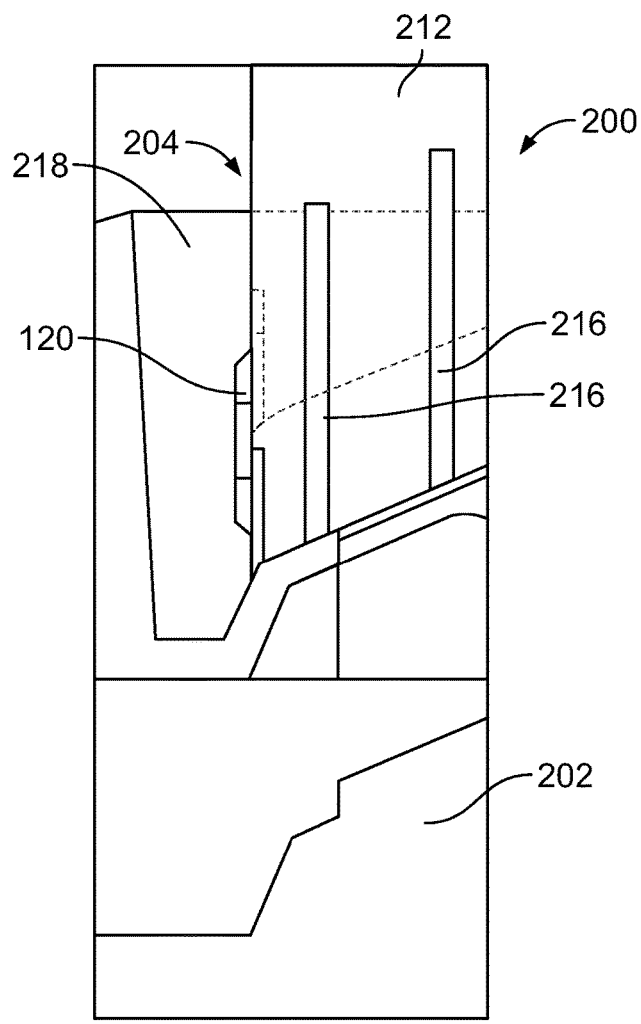
FIG. 19 illustrates a lateral internal view of a flap-retaining clip within a forming assembly during an initial ejection stage, according to an embodiment of the present disclosure.

FIG. 19 illustrates a lateral internal view of the flap-retaining clip 120 within the forming assembly 200 during an initial ejection stage, according to an embodiment of the present disclosure. The flap-retaining clip 120 is pushed away from the core 212 by one or more pins 216 and/or a retainer 218 of the forming assembly 200. For example, the pins 216 may be actuated to vertically move the core 212 away from the flap-retaining clip 120 and/or the retainer 218.

Figure 20:
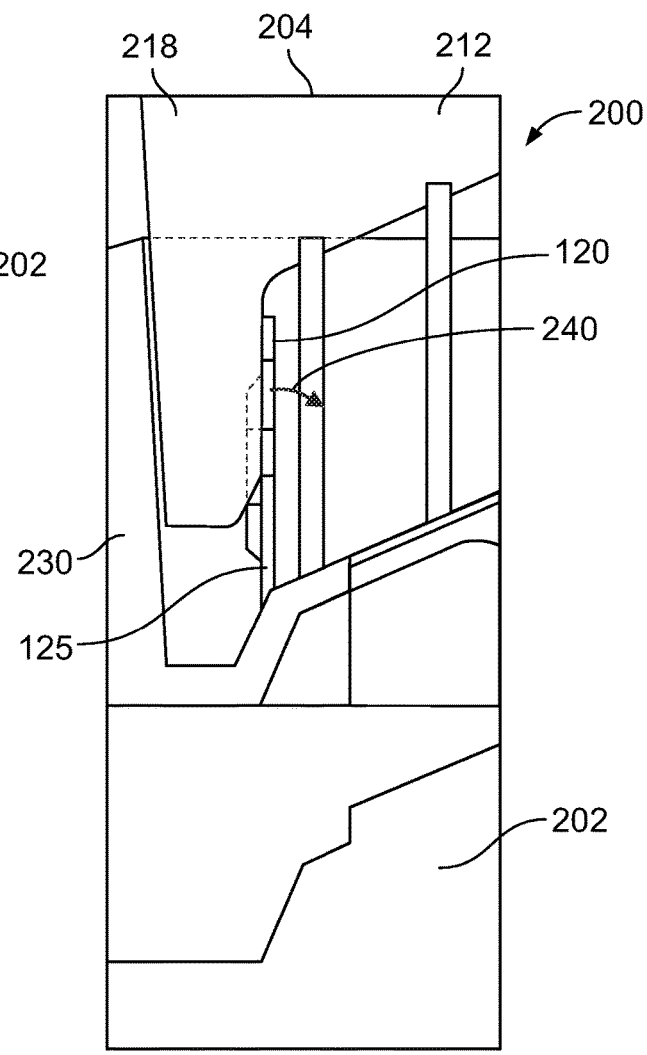
FIG. 20 illustrates a lateral internal view of a flap-retaining clip within a forming assembly during a final ejection stage, according to an embodiment of the present disclosure.

FIG. 20 illustrates a lateral internal view of the flap-retaining clip 120 within the forming assembly 200 during a final ejection stage, according to an embodiment of the present disclosure. The retainer 218 is moved away from the flap-retaining clip 120 (or vice versa), to allow the formed flap-retaining clip 120 to be removed from the forming assembly. In this manner, the flap-retaining clip 120 may be efficiently formed.

As shown in FIG. 20, the flap-retaining clip 120 may flex away from the retainer 218 and a fixed mount 230 of the forming assembly 200 in the direction of arc 240. For example, the flap-retaining clip 120 may flex about the resilient housings connecting tab 125.

Referring to FIGS. 17-20, the flap-retaining clip may be efficiently manufactured, such as through a two-stage knockout process. The flap-retaining clip 120 may be integrally molded and formed as a single piece through the initial molding (shown in FIG. 17) and a two-stage knockout process (shown in FIGS. 17-20).

As described above, the flap-retaining clip 120 secures a membrane flap 150 to the housing 100 without the use of a separate and distinct retainer bar. Additionally, the flap-retaining clip 150 may be devoid of a stepped shoulder or stop, which may otherwise be susceptible to attracting and/or retaining debris, and/or provide a leak path.

Embodiments of the present disclosure provide a pressure relief assembly that eliminates, minimizes, or otherwise reduces a possibility of debris accumulation. Embodiments of the present disclosure provide a pressure relief assembly that includes membrane flaps secured to a housing without leak paths.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A flap-retaining clip configured to securely couple a membrane flap to a housing of a pressure relief assembly, the flap-retaining clip comprising:
   a main body having a face;
   a housing-connecting tab extending from a first end of the main body, wherein the housing-connecting tab is configured to be inserted into and retained within a retaining channel formed in the housing; and
   opposed flap-retention wings laterally extending from opposite sides of the main body, wherein a portion of the membrane flap is configured to be trapped between the opposed flap-retention wings and the housing to securely couple the membrane flap to the housing,
   wherein at least a portion of the opposed flap-retention wings is stepped relative to the face of the main body.

2. The flap-retaining clip of claim 1, wherein each of the opposed flap retention wings comprises an angled lead-in edge that downwardly and outwardly angles from a top end of the main body towards the first end.

3. The flap-retaining clip of claim 2, wherein the angled lead-in edge is arcuate.

4. The flap-retaining clip of claim 1, further comprising a rounded tip wherein the rounded tip is configured to guide the membrane flap onto the flap-retaining clip.

5. The flap-retaining clip of claim 4, further comprising an angled ramp between the rounded tip and the main body.

6. The flap-retaining clip of claim 1, wherein bottom edges of the opposed flap-retention wings are configured to be separated from a front surface of a portion of the housing, wherein a portion of the membrane flap is configured to be trapped between the front surface and the bottom edges of the opposed flap-retention wings.

7. The flap-retaining clip of claim 1, further comprising a securing member that extends between the main body and the housing-connecting tab, wherein the securing member is configured to secure the flap-retaining clip within a channel of the housing.

8. The flap-retaining clip of claim 1, wherein the flap-retaining clip is integrally formed and molded as a single piece.

9. The flap-retaining clip of claim 1, wherein the flap-retaining clip is molded within a cavity of a forming chamber of a forming assembly, wherein the forming assembly separates in a vertical direction such that the flap-retaining clip remains connected to a core of a top portion of the forming assembly, wherein the flap retaining clip is pushed away from the core by one or more pins of the forming assembly, and wherein a retainer is moved away from the flap-retaining clip to allow the flap retaining clip to be removed from the forming assembly.

10. A pressure relief assembly comprising:
    a housing defining an air passage chamber having at least one opening;
    a membrane flap secured within the air passage chamber, wherein the membrane flap is configured to move into an open position to expose the at least one opening to relieve air pressure; and
    a plurality of flap-retaining clips that securely couple the membrane flap to the housing, wherein each of the plurality of the flap-retaining clips comprises:
       a main body having a face;
       a housing-connecting tab extending from a first end of the main body, wherein the housing-connecting tab is retained within a retaining channel formed in the housing; and
       opposed flap-retention wings laterally extending from opposite sides of the main body, wherein a portion of the membrane flap is trapped between the opposed flap-retention wings and the housing to securely couple the membrane flap to the housing,
       wherein at least a portion of the opposed flap-retention wings is stepped relative to the face of the main body.

11. The pressure relief assembly of claim 10, wherein each of the opposed flap-retention wings comprises an angled lead-in edge that downwardly and outwardly angles from a top end of the main body towards the first end.

12. The pressure relief assembly of claim 10, wherein each of the plurality of flap-retaining clips comprises a rounded tip upwardly extending from a top end of the main body, wherein the rounded tip guides the membrane flap onto the flap-retaining clip.

13. The pressure relief assembly of claim 12, wherein each of the plurality of flap-retaining clips comprises an angled ramp between the rounded tip and the main body.

14. The pressure relief assembly of claim 10, wherein bottom edges of the opposed flap-retention wings are separated from a front surface of a portion of the housing, wherein a portion of the membrane flap is trapped between the front surface and the bottom edges of the opposed flap-retention wings.

15. The pressure relief assembly of claim 10, wherein each of the plurality of flap-retaining clips comprises a securing member that extends between the main body and the housing-connecting tab, wherein the securing member secures the flap-retaining clip within the retaining channel of the housing.

16. The pressure relief assembly of claim 10, wherein each of the flap retaining clips is integrally formed and molded as a single piece.

17. The pressure relief assembly of claim 10, wherein each of the flap retaining clips is molded within a cavity of a forming chamber of a forming assembly, wherein the forming assembly separates in a vertical direction such that the flap-retaining clip remains connected to a core of a top portion of the forming assembly, wherein the flap-retaining clip is pushed away from the core by one or more pins of the forming assembly, and wherein a retainer is moved away from the flap-retaining clip to allow the flap-retaining clip to be removed from the forming assembly.

18. A flap-retaining clip configured to securely couple a membrane flap to a housing of a pressure relief assembly, the flap-retaining clip comprising:

a main body;

a housing-connecting tab extending from a first end of the main body, wherein the housing-connecting tab is configured to be inserted into and retained within a retaining channel formed in the housing;

opposed flap-retention wings laterally extending from opposite sides of the main body, wherein a portion of the membrane flap is configured to be trapped between the opposed flap-retention wings and the housing to securely couple the membrane flap to the housing, wherein each of the opposed flap-retention wings comprises an angled leading edge that downwardly and outwardly angles from a top end of the main body towards a first end, wherein bottom edges of the opposed flap-retention wings are configured to be separated from a front surface of a portion of the housing, wherein a portion of the membrane flap is configured to be trapped between the front surface and the bottom edges of the opposed flap-retention wings;

a rounded tip configured to guide the membrane flap onto the flap-retaining clip; and an angled surface between the main body and the rounded tip.

19. The flap-retaining clip of claim 18, wherein the main body includes a face and at least a portion of the opposed-flap retention wings is stepped relative to the face of the main body.

* * * * *